A. M. LAYCOCK.
BEARING CLAMP.
APPLICATION FILED OCT. 9, 1915.
1,169,271.
Patented Jan. 25, 1916.
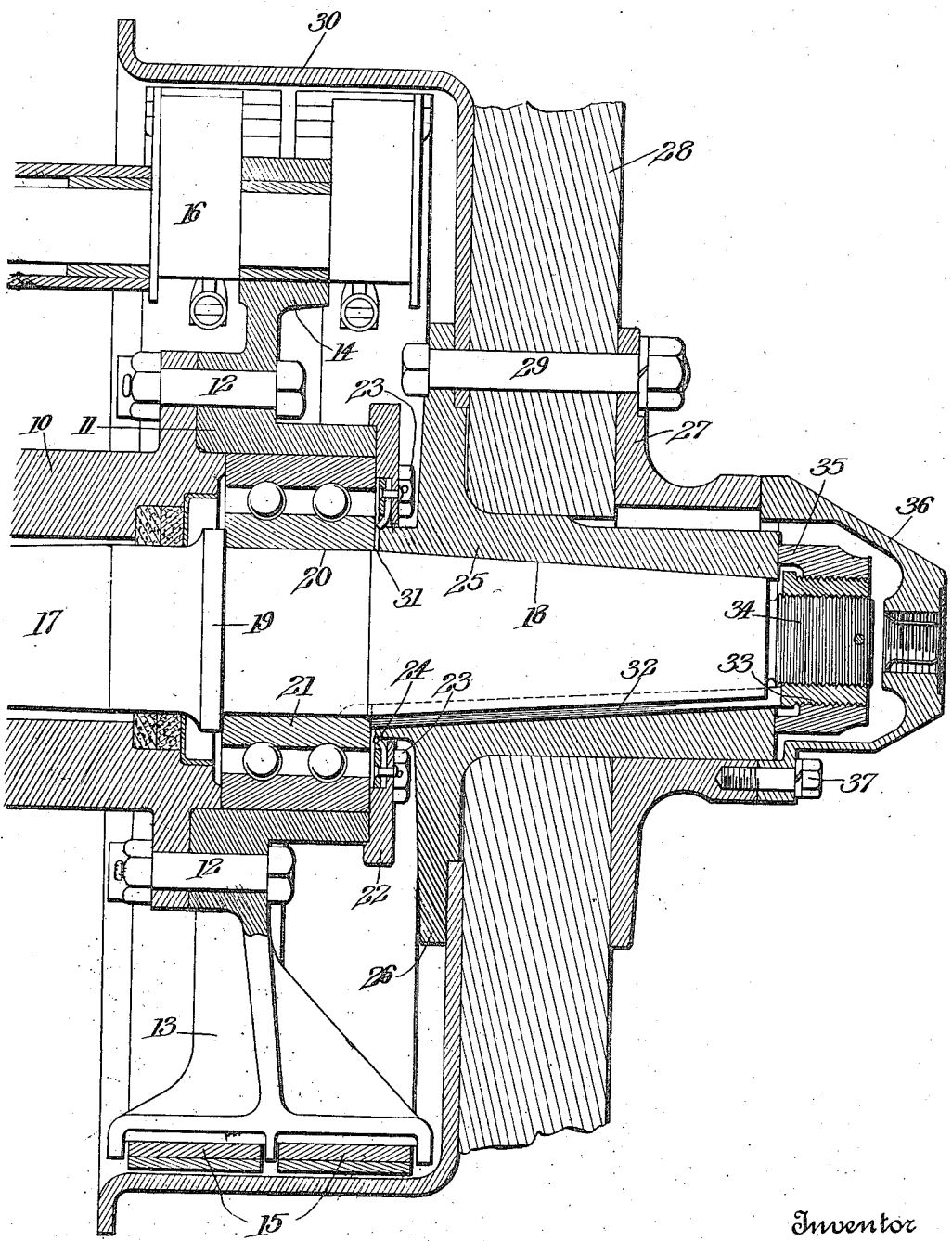

UNITED STATES PATENT OFFICE.

ARTHUR MAUNDER LAYCOCK, OF KINGSTON, PENNSYLVANIA.

BEARING-CLAMP.

1,169,271.      Specification of Letters Patent.      Patented Jan. 25, 1916.

Application filed October 9, 1915. Serial No. 55,056.

*To all whom it may concern:*

Be it known that I, ARTHUR M. LAYCOCK, a subject of the King of Great Britain, and resident of Kingston, county of Luzerne, State of Pennsylvania, have invented certain new and useful Improvements in Bearing-Clamps, of which the following is a specification.

This invention relates to vehicle axles and more particularly to axles for motor vehicles and to the means for taking the axial thrusts of the wheels.

In certain prior constructions in which the driving wheels of the vehicle are mounted on the tapered ends of the driving shafts and the load supported by bearings between the end portions of the shafts and the tubular axle, difficulty has been experienced because of the fact that the tapered fit between the wheel hub and the shaft makes the position of the hub on the shaft indeterminate from a manufacturing standpoint so that it was necessary to provide a slight clearance between the inner end of the hub and the bearing in order to be certain that the hub would fit securely on the tapered end of the shaft. The clearance thus provided left the bearing free to move outwardly on the shaft a slight amount and in use the axial thrusts caused by the wheel resulted in excessive wear between the bearing and the shaft and permitted the wheel to be comparatively loose in an axial direction.

It is the object of the present invention to overcome this difficulty in a very simple and commercially practicable manner so that the bearing will be held securely against axial movement relatively to the shaft.

One form of the invention is illustrated in the accompanying drawing which is a section through the end portion of an axle and the wheel, the section being taken on the axis of the driving shaft.

Referring to the drawing, 10 indicates an end portion of a tubular axle to which an extension 11 is secured by means of bolts 12. The extension 11 has oppositely projecting arms 13 and 14 thereon which carry the brakes 15 and the actuating mechanism 16 therefor.

A driving shaft 17 is arranged in the tubular axle 10 and has a tapered end portion 18 and a shoulder 19, the shaft being cylindrical as indicated at 20, between the shoulder 19 and the tapered part 18, to receive the roller bearing 21, this bearing being held against inward movement on the shaft by the shoulder 19. The bearing 21 is arranged in the extension 11 and is secured against axial movement therein by a plate 22, this plate being secured to the extension by bolts 23 and having an inwardly projecting flange 24 of flexible material which coöperates with the wheel hub 25 to exclude dust and dirt from the bearing 21. The hub 25 has a flange 26 integral therewith and has keyed thereto a removable flange 27 which coöperates with the flange 26 to secure the usual spokes 28 to the hub. The flanges 26 and 27 are secured together by bolts 29 which also secure the brake drum 30 to the flange 26.

The hub 25 has a tapered bore fitting the tapered end 18 of the shaft 17 and, as will be understood by those skilled in the art, it is impracticable from a commercial standpoint to so fit the hub to the shaft that the position of the hub on the shaft may be accurately predetermined. For this reason it is necessary to provide a slight clearance space, indicated at 31, between the inner end of the hub and the bearing 21 and in order to secure the bearing against axial movement on the part 20 of the shaft 17 I have provided a key 32 which extends through the hub 25 and has its inner end in engagement with the bearing 21. The outer end of the key 32 is engaged by a nut 33 which is secured onto the threaded portion 34 at the extreme end of the shaft 17. In order to secure the hub 25 against outward movement on the tapered end 18 of the shaft, a nut 35 is provided and in the preferred construction this nut has threaded engagement with the exterior of the nut 33. By this construction the key 32 and the hub are independently secured against axial displacement.

The outer end of the wheel hub may be closed by the usual cap 36 which may be secured to the wheel in any preferred manner as by means of one or more bolts 37.

From the foregoing it will be evident that the key 32 will coöperate with the abutment or shoulder 19 to secure the bearing 21 against axial movement in either direction relatively to the shaft 17. It will also be evident that the position of the hub 25, on the tapered end 18 of the shaft may be varied within the usual manufacturing limits without in any way affecting the means for securing the bearing 21.

Having thus described my invention what I claim is:

1. The combination of a tubular axle, a driving shaft therein having an abutment adjacent the end of said axle and a tapered end portion, a roller bearing for supporting said shaft between said abutment and said tapered end, a wheel hub secured on said tapered end, a key extending through said hub and engaging said bearing, said key coöperating with said abutment to secure the bearing against axial movement on said shaft, and means for securing said key.

2. The combination of a tubular axle, a driving shaft therein having an abutment adjacent the end of said axle and a tapered end portion, a roller bearing for supporting said shaft between said abutment and said tapered end, a wheel hub on said tapered end, a key extending through said hub and engaging said bearing, said key coöperating with said abutment to secure the bearing against axial movement on said shaft, means for securing said key, and means for securing said hub.

3. The combination of a tubular axle, a driving shaft therein having a tapered end portion, a bearing between said shaft and said tubular axle held against inward movement on said shaft, a wheel hub secured on said tapered end of the shaft, a key extending through said hub and engaging said bearing to hold the latter against outward movement relative to the shaft, and means for securing said key.

4. The combination of a tubular axle, a driving shaft therein having a tapered end portion, a bearing between said shaft and said tubular axle held against inward movement on said shaft, a wheel hub secured on said tapered end of the shaft, a key extending through said hub and engaging said bearing to hold the latter against outward movement relative to the shaft and a nut on the end of said shaft engaging the end of said key and securing the latter against outward movement.

5. The combination of a tubular axle, a driving shaft therein having a tapered end portion, a bearing between said shaft and said tubular axle held against inward movement on said shaft, a wheel hub secured on said tapered end of the shaft, a key extending through said hub and engaging said bearing to hold the latter against outward movement relative to the shaft, a nut on said shaft engaging the end of said key and securing the key against outward movement and a nut for securing said hub.

6. The combination of a tubular axle, a driving shaft therein having a tapered end portion, a bearing between said shaft and said tubular axle held against inward movement on said shaft, a wheel hub secured on said tapered end of the shaft, a key extending through said hub and engaging said bearing to hold the latter against outward movement relative to the shaft, a nut on said shaft engaging the end of said key and a nut threaded on the exterior of the first mentioned nut for securing said hub.

In testimony whereof I affix my signature.

ARTHUR MAUNDER LAYCOCK.